(12) United States Patent
Sung et al.

(10) Patent No.: US 12,224,899 B2
(45) Date of Patent: Feb. 11, 2025

(54) APPARATUS AND METHOD FOR PERFORMING ONBOARDING PROCEDURE FOR REMOTE PROVISIONING

(71) Applicant: ELECTRONICS AND TELECOMMUNICATIONS RESEARCH INSTITUTE, Daejeon (KR)

(72) Inventors: Jihoon Sung, Daejeon (KR); Soohwan Lee, Daejeon (KR); Myung Ki Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 30 days.

(21) Appl. No.: 17/740,934

(22) Filed: May 10, 2022

(65) Prior Publication Data

US 2022/0360493 A1   Nov. 10, 2022

(30) Foreign Application Priority Data

May 10, 2021  (KR) .................. 10-2021-0060163
May 27, 2021  (KR) .................. 10-2021-0068440
Oct. 28, 2021  (KR) .................. 10-2021-0145459
May 9, 2022    (KR) .................. 10-2022-0056609

(51) Int. Cl.
| | | |
|---|---|---|
| *H04L 41/0806* | (2022.01) | |
| *H04W 12/06* | (2021.01) | |
| *H04W 12/72* | (2021.01) | |
| *H04W 60/04* | (2009.01) | |
| *H04W 76/11* | (2018.01) | |
| *H04W 76/18* | (2018.01) | |

(52) U.S. Cl.
CPC ......... *H04L 41/0806* (2013.01); *H04W 12/06* (2013.01); *H04W 12/72* (2021.01); *H04W 60/04* (2013.01); *H04W 76/11* (2018.02); *H04W 76/18* (2018.02)

(58) Field of Classification Search
USPC ......................................................... 709/224
See application file for complete search history.

(56) References Cited

U.S. PATENT DOCUMENTS

2015/0023183 A1   1/2015  Ilsar et al.
2015/0317467 A1   11/2015  Rattner et al.
(Continued)

FOREIGN PATENT DOCUMENTS

KR   10-2016-0146732 A   12/2016
KR   10-2019-0004217 A   1/2019
(Continued)

OTHER PUBLICATIONS

"3GPP TSG-SA WG2 Meeting #145-e S2-2104028" E-Meeting, May 17-May 28, 2021 (15 pages in English).
(Continued)

*Primary Examiner* — Atta Khan
(74) *Attorney, Agent, or Firm* — NSIP Law

(57) ABSTRACT

A terminal for performing an onboarding procedure for remote provisioning through steps of: receiving an onboarding enabled indication from at least one onboarding network; selecting an onboarding network based on the onboarding enabled indication and onboarding network selection information; and attempting registration for the selected onboarding network is provided.

8 Claims, 4 Drawing Sheets

(56) References Cited

U.S. PATENT DOCUMENTS

| | | |
|---|---|---|
| 2019/0007500 A1 | 1/2019 | Kim et al. |
| 2019/0007992 A1 | 1/2019 | Kim et al. |
| 2019/0059067 A1 | 2/2019 | Lee et al. |
| 2021/0058784 A1 | 2/2021 | Kedalagudde et al. |
| 2021/0144593 A1 | 5/2021 | Ahn |
| 2021/0226860 A1 | 7/2021 | Lee et al. |
| 2021/0368433 A1 | 11/2021 | Kweon et al. |
| 2022/0046530 A1* | 2/2022 | Lai ................. H04W 48/18 |
| 2022/0330022 A1* | 10/2022 | Kolekar ............ H04W 60/00 |
| 2023/0075285 A1* | 3/2023 | Jung ................ H04W 48/18 |
| 2023/0137814 A1* | 5/2023 | Staufer ............. H04W 12/06 |
| | | 455/411 |
| 2023/0156470 A1* | 5/2023 | Kweon ............ H04W 12/069 |
| | | 455/410 |

FOREIGN PATENT DOCUMENTS

| | | |
|---|---|---|
| KR | 10-2019-0004221 A | 1/2019 |
| KR | 10-2019-0019005 A | 2/2019 |
| KR | 10-2019-0060667 A | 6/2019 |
| KR | 10-2020-0035298 A | 4/2020 |
| KR | 10-2021-0144211 A | 11/2021 |
| WO | WO 2019/034291 A1 | 2/2019 |

OTHER PUBLICATIONS

"3GPP TSG-SA WG2 Meeting #145-e S2-2104334r09" *E-Meeting,* May 17-28, 2021 (13 pages in English).

"Discussion the issues to support UE on-boarding and provisioning for NPN" R2-2101616, CMCC, 3GPP TSG-RAN WG2 #113e, Online, Jan 25-Feb. 5, 2021, (9 pages).

\* cited by examiner

APPARATUS AND METHOD FOR PERFORMING ONBOARDING PROCEDURE FOR REMOTE PROVISIONING

CROSS-REFERENCE TO RELATED APPLICATION

This application claims priority to and the benefit of Korean Patent Application No. 10-2021-0060163 filed in the Korean Intellectual Property Office on May 10, 2021, Korean Patent Application No. 10-2021-0068440 filed in the Korean Intellectual Property Office on May 27, 2021, Korean Patent Application No. 10-2021-0145459 filed in the Korean Intellectual Property Office on Oct. 28, 2021, and Korean Patent Application No. 10-2022-0056609 filed in the Korean Intellectual Property Office on May 9, 2022, the entire contents of which are incorporated herein by reference.

BACKGROUND

(a) Field

The present disclosure relates to an apparatus and method for performing an onboarding procedure for remote provisioning.

(b) Description of Related Art

The 5G non-public network (NPN) can be used as a dedicated network for the vertical industry. In the case of terminals used in the dedicated networks for industry, subscription information for the network may not be set, so an automatic configuration method for the subscription information may be required for these terminals. Remote provisioning for the subscription information may be an example of such an automatic configuration method. The terminal can receive information required to access a target network from a provisioning server located remotely through an onboarding network.

The above information disclosed in this Background section is only for enhancement of understanding of the background of the invention, and therefore it may contain information that does not form the prior art that is already known in this country to a person of ordinary skill in the art.

SUMMARY

Embodiments of the invention provide a terminal performing an onboarding procedure.

Embodiments of the invention provide an access and mobility management function (AMF) in an onboarding network.

Embodiments of the invention provide a session management function (SMF) in an onboarding network.

According to an embodiment, a terminal for performing an onboarding procedure for remote provisioning is provided. The terminal includes: a processor, a memory, and a communication device, wherein the processor executes a program stored in the memory to perform: receiving an onboarding enabled indication from at least one onboarding network through the communication device; selecting an onboarding network based on the onboarding enabled indication and onboarding network selection information configured in the terminal; and attempting registration for the selected onboarding network through the communication device.

In such embodiment, when attempting registration for the selected onboarding network, the processor may execute the program to perform transmitting a radio resource control (RRC) connection request message to an access network (AN) node of the selected onboarding network through the communication device, and the RRC connection request message may include an indication indicating that the RRC connection request is for an onboarding service.

In such embodiment, the processor may execute the program to further perform transmitting a non-access stratum (NAS) registration request to an access and mobility management function (AMF) in the selected onboarding network through the communication device, and the AMF may be selected by the AN node based on the indication indicating that the RRC connection request is for the onboarding service.

In such embodiment, when transmitting a NAS registration request to an AMF of the selected onboarding network, the processor may execute the program to perform setting a registration type to a value indicating that the NAS registration request is for the onboarding service.

In such embodiment, the NAS registration request may include a subscription concealed identifier (SUCI) of the terminal.

In such embodiment, the processor may execute the program to further perform: transmitting a protocol data unit (PDU) session establishment request to the AMF through the communication device after the NAS registration request is accepted; and receiving a response corresponding to the PDU session establishment request from the AMF through the communication device and accessing a provisioning server (PVS) for the remote provisioning.

In such embodiment, the response may include configuration data for the remote provisioning and the configuration data includes a PVS Internet protocol (IP) address or PVS fully qualified domain name (FQDN) of the PVS.

In such embodiment, the processor may execute the program to further perform receiving stand-alone Non-Public Network (SNPN) credentials from the PVS after accessing the PVS, and the SNPN credentials may be information required for the terminal to access the SNPN.

According to an embodiment, an access and mobility management function (AMF) in an onboarding network is provided. The AMF includes a processor, a memory, and a communication device, wherein the processor executes a program stored in the memory to perform: receiving a protocol data unit (protocol data unit, PDU) session establishment request from a terminal on which authentication for the onboarding network is completed through the communication device, selecting an appropriate session management function (SMF) for the onboarding service of the terminal; and sending a request to create a PDU session with the terminal to the selected SMF.

In such embodiment, when selecting an appropriate SMF for the onboarding service of the terminal, the processor may execute the program to perform selecting the SMF based on AMF onboarding configuration data, and the AMF onboarding configuration data may include Single—Network Slice Selection Assistance Information (S-NSSAI) and data network name (DNN) to be used for the onboarding service or information about an SMF supporting DNN and S-NSSAI used for the onboarding service.

In such embodiment, the processor may execute the program to perform: receiving UE configuration data related to remote provisioning for the terminal from a server located outside the onboarding network through the communication device; and sending the UE configuration data to the SMF.

In such embodiment, the UE configuration data may include a provisioning server (PVS) Internet protocol (IP) address and/or PVS fully qualified domain name (FQDN) of a PVS for the remote provisioning.

In such embodiment, the server located outside the onboarding network may be determined by an authentication server function (AUSF) of the onboarding network based on a subscription concealed identifier (SUCI) of the terminal.

In such embodiment, the processor may execute the program to further perform: transferring a subscription concealed identifier (SUCI) of the terminal included in a NAS registration request message received from the terminal to an authentication server function (AUSF) of the onboarding network; and notifying the terminal of a result of the registration for the onboarding network through the communication device if an authentication of the terminal is successfully completed by the AUSF based on the SUCI.

In such embodiment, the authentication of the terminal may be performed by the AUSF based on default UE credentials and the default UE credentials may be received from the terminal.

According to an embodiment, a session management function (SMF) in an onboarding network is provided. The SMF includes a processor, a memory, and a communication device, wherein the processor executes a program stored in the memory to perform: receiving a creation request of a protocol data unit (PDU) session for providing an onboarding service to a terminal from an access and mobility management function (AMF) in the onboarding network; and selecting a user plane function (user plane function, UPF) for the onboarding service based on AMF onboarding configuration data included in the creation request.

In such embodiment, when selecting a UPF for the onboarding service based on AMF onboarding configuration data included in the creation request, the processor may execute the program to perform selecting the UPF using data network name (DNN) and Single—Network Slice Selection Assistance Information (S-NSSAI) in the AMF onboarding configuration data.

In such embodiment, the processor may execute the program to further perform: receiving, from the AMF, UE configuration data related to remote provisioning for the terminal; and sending the UE configuration data to the terminal through a response message for establishment of the PDU session by using the communication device, the UE configuration data may be transmitted from a server located outside the onboarding network to the AMF.

In such embodiment, the UE configuration data may include a provisioning server (PVS) Internet protocol (IP) address and/or PVS fully qualified domain name (FQDN) of a PVS for the remote provisioning.

In such embodiment, the UE configuration data may take precedence over UE configuration data configured in the terminal.

DETAILED DESCRIPTION

Figure 1:
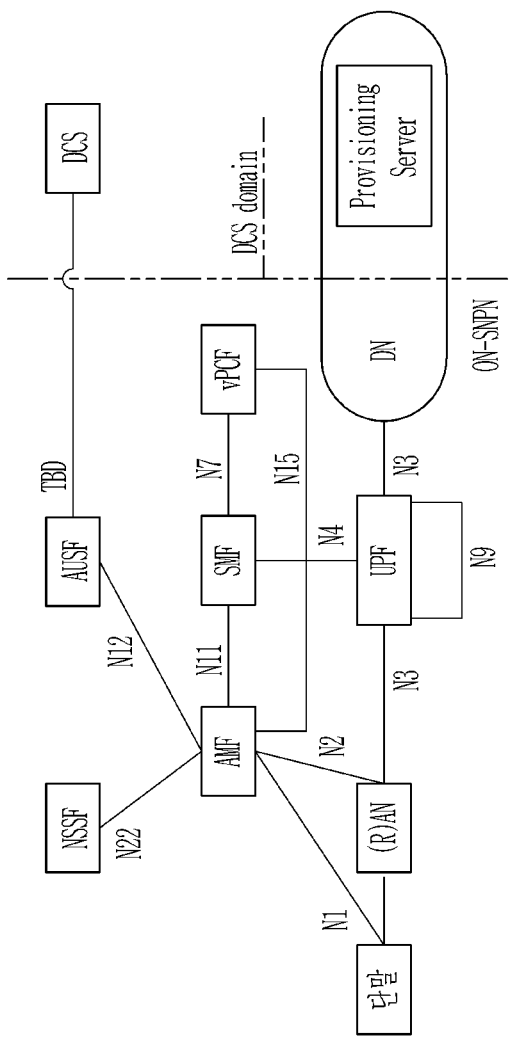
FIG. 1 is a diagram illustrating an onboarding SNPN architecture according to an embodiment.

In the following detailed description, only certain embodiments of the present invention have been shown and described in detail with reference to the accompanying drawing, simply by way of illustration. However, the present disclosure may be implemented in various different forms and is not limited to the embodiments described herein. Further, in order to clearly describe the description in the drawing, parts not related to the description are omitted, and similar reference numerals are attached to similar parts throughout the specification.

Throughout the specification, a terminal may be called user equipment (UE), mobile station (MS), a mobile terminal (MT), an advanced mobile station (AMS), a high reliability mobile station (HR-MS), a subscriber station (SS), a portable subscriber station (PSS), an access terminal (AT), a machine type communication device (MTC device), and the like and may also include all or some of the functions of the MS, the MT, the AMS, the HR-MS, the SS, the PSS, the AT, the UE, the MTCH device, and the like.

Further, the base station (BS) may be called an advanced base station (ABS), a high reliability base station (HR-BS), a node B, an evolved node B (eNodeB), an access point (AP), a radio access station (RAS), a base transceiver station (BTS), a mobile multi-hop relay (MMR)-BS, a relay station (RS) serving as a base station, a relay node (RN) serving as a base station, an advanced relay station (RS) serving as a base station, a high reliability relay station (HR-RS) serving as a base station, small base stations (a femto base station (femto BS), a home node B (HNB), a home eNodeB (HeNB), a pico base station (pico BS), a macro base station (macro BS), a micro base station (micro BS), and the like), and the like and may also include all or some of the functions of the ABS, the node B, the eNodeB, the AP, the RAS, the BTS, the MMR-BS, the RS, the RN, the ARS, the HR-RS, the small base stations, and the like.

In this specification, unless explicitly described to the contrary, the word "comprises", and variations such as "including" or "containing", will be understood to imply the inclusion of stated elements but not the exclusion of any other elements.

In this specification, expressions described in singular can be interpreted as singular or plural unless explicit expressions such as "one" or "single" are used.

In this specification, "and/or" includes all combinations of each and at least one of the mentioned elements.

In this specification, terms including ordinal numbers such as first and second may be used to describe various configurations elements, but the elements are not limited by the terms. The terms may be only used to distinguish one element from another element. For example, a first element may be named a second element without departing from the right range of the present disclosure, and similarly, a second element may be named a first element.

In the flowchart described with reference to the drawings in this specification, the order of the operations may be changed, several operations may be merged, certain operations may be divided, and specific operations may not be performed.

FIG. 1 is a diagram illustrating an onboarding SNPN architecture according to an embodiment.

Onboarding of a terminal for a stand-alone Non-Public Network (SNPN) allows the terminal to access the onboarding network (ONN), thereby SNPN credentials which are necessary to access the target SNPN may be provisioned to the terminal. When the terminal accesses the ONN, default UE credentials may be used for authentication of the terminal, and the SNPN credentials required for primary authentication and other information to the terminal in order for the terminal to access to the target SNPN (desired SNPN) may be provisioned. In an embodiment, the terminal may (re-) select and (re-)register with the target SNPN as a network that provides services to be used for the terminal.

In an embodiment, the default UE credentials is information that allows the onboarding network to uniquely identify the terminal and establish a verifiable secure connection when the terminal performs UE onboarding.

In an embodiment, in order to provision the SNPN credentials to the terminal configured with the default UE credentials, the terminal may select an SNPN as the ONN, and may establish a secure connection with the selected SNPN. In an embodiment, the SNPN selected as the ONN may be referred to as an onboarding SNPN (ON-SNPN).

Alternatively, to provision the SNPN credentials to a USIM-equipped terminal configured with default Public Land Mobile Network (PLMN) credentials, the terminal may select a PLMN as the ONN, and establish a secure connection with the selected PLMN.

After the secure connection with the ON-SNPN is established, the terminal may be provisioned with the SNPN credentials and other data for discovery, (re-) selection, and/or (re-)registration for the target SNPN.

The ON-SNPN and subscription owner SNPN (SO-SNPN) may refer to roles performed by one SNPN or different SNPNs. The same network may perform both the ON-SNPN and the SO-SNPN roles for a specific terminal.

In an embodiment, a network function (NF) may be implemented as a network element on a dedicated hardware, or a software instance running on the dedicated hardware, or a virtualised function instantiated on an appropriate platform (e.g., cloud infrastructure).

In FIG. 1, the AUSF in the ON-SNPN may have an interface with a default credential server (DCS) belonging to an entity located inside or outside the ON-SNPN. And in order to provision the SNPN credentials from the SO-SNPN to the terminal, information may be exchanged between the PVS and the SO-SNPN.

In an embodiment, the DCS may be an entity capable of performing authentication for the terminal based on the default UE credentials. In an embodiment, the DCS may provide other entities with means for performing the authentication based on the default UE credentials. In FIG. 1, the dotted lines shown between a DCS domain, a provisioning server (PVS) domain, the ON-SNPN, and/or the SO-SNPN may indicate that the domains may not be separated according to a deployment scenario.

The DCS may be used to perform the authentication using the default UE credentials during the onboarding procedure of the terminal.

PVS may interact with the SO-SNPN using mechanism/protocols that is not defined in 3GPP. PVS may provision the terminal with the SNPN credentials and other data required for the terminal to access the target SNPN by interacting with the SO-SNPN.

In an embodiment, the DCS and the PVS may be owned by one entity (e.g., an administrative entity), where the entity may be different from the ON-SNPN and/or the SO-SNPN.

Figure 2:
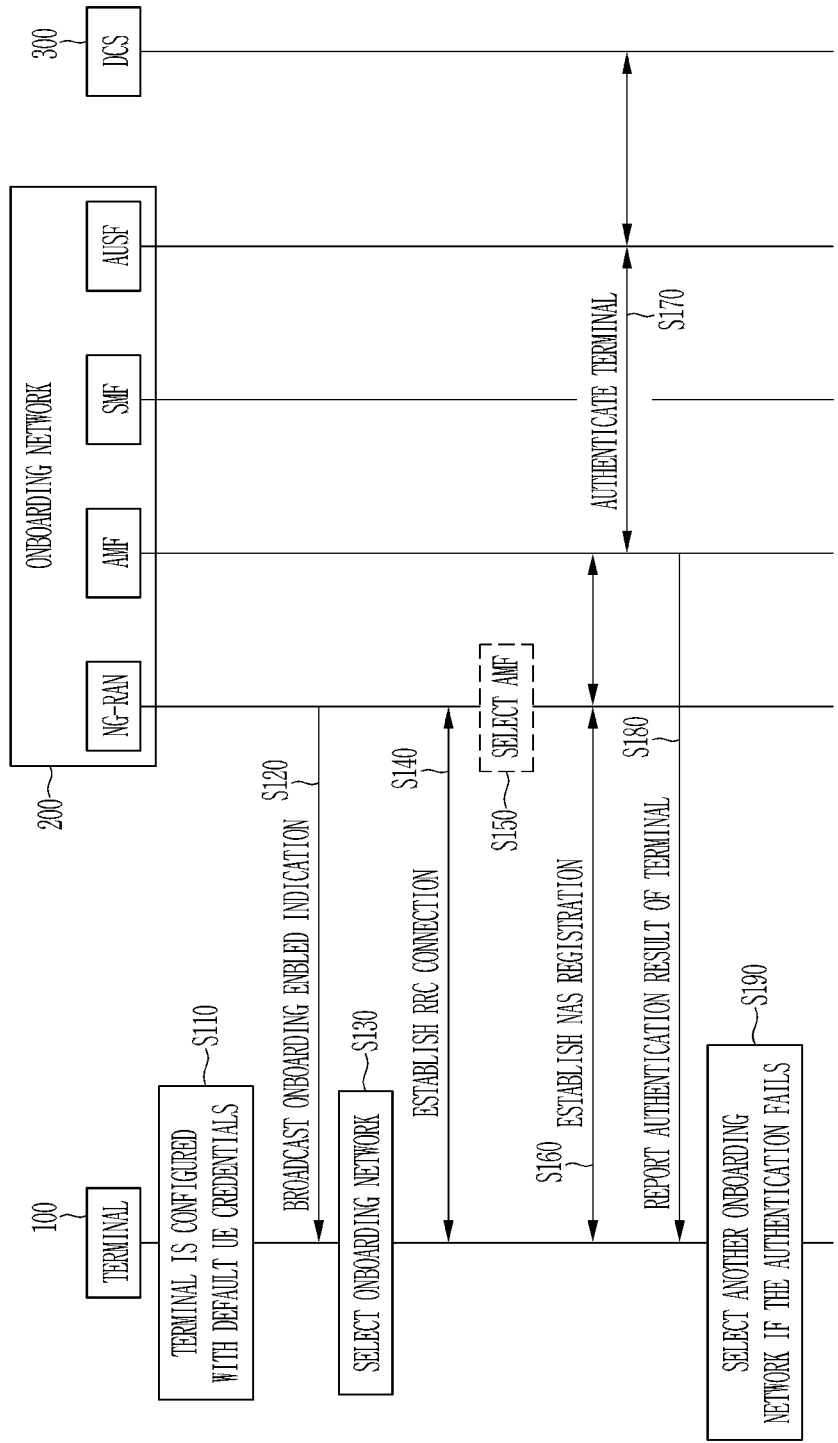
FIG. 2 is a flowchart illustrating a registration procedure for onboarding of a terminal according to an embodiment.

FIG. 2 is a flowchart illustrating a registration procedure for onboarding of a terminal according to an embodiment.

Referring to FIG. 2, terminal 100 capable of supporting UE onboarding may be pre-configured with the default UE credentials (S110).

In an embodiment, in the terminal 100 that can support UE onboarding, ONN (e.g., ON-SNPN) selection information may be pre-configured along with the default UE credentials. The ONN selection information may include SNPN network identifier(s) and/or GIN(s), and contents of the ON-SNPN selection information may be determined according to the implementation of the terminal 100. In an embodiment, the terminal 100 may use the ONN selection information to select the ON-SNPN. Here, it may be assumed that Single—Network Slice Selection Assistance Information (S-NSSAI) and a data network name (DNN) are not configured in the terminal 100 when registering for the purpose of UE onboarding for the ON-SNPN.

When an SNPN supports onboarding of the terminal 100 for SNPNs (i.e., when the SNPN can be used as the ON-SNPN), an NG-RAN of the SNPN may broadcast an onboarding enabled indication (S120). The onboarding enabled indication may be included in system information broadcast by the SNPN.

In an embodiment, the onboarding enabled indication may indicate whether the onboarding is currently possible in the SNPN. The onboarding enabled indication, for example, may be broadcast for each cell so that the onboarding procedure can be started only in some areas of the SNPN. The onboarding enabled indication broadcast in each cell may not affect a mobility management function. For example, if the terminal 100 selects the ON-SNPN and successfully registers with the selected ON-SNPN, the remote provisioning service may still be continued to the terminal 100 even when the terminal 100 moves to a cell (in the ON-SNPN) that does not indicate whether to support the onboarding (i.e., a cell does not broadcast the onboarding enabled indication).

When the terminal 100 is about to perform UE onboarding via the SNPN, the terminal 100 may perform ONN selection. The ON-SNPN may be a SNPN that provides access to the terminal 100 for UE onboarding. The UE onboarding procedure may be triggered by a power-on event in the terminal 100 or may be triggered by an input of the user. Alternatively, the trigger to initiate the UE onboarding procedure may depend on the terminal implementation.

In an automatic or manual selection, the terminal 100 may select one of the ONNs broadcasting the onboarding enabled indication and attempt to register for the selected ONN (S130). In an embodiment, the terminal 100 may match the pre-configured ONN selection information including the SNPN network identifier and/or GIN(s) with the received onboarding enabled indication according to a predetermined or pre-implemented logic procedure. If the terminal 100 fails to register, terminal 100 may select another ON-SNPN according to the pre-configured ONN selection information and attempt to register with another ON-SNPN.

In FIG. 2, when the user or the terminal 100 of the user selects the ON-SNPN, the terminal 100 may establish a radio resource control (RRC) connection to the NG-RAN node of the ON-SNPN (S140). In an embodiment, the terminal 100 may provide, through an RRC connection establishment request message, an indication indicating that the RRC connection request is for the onboarding service. The NG-RAN node receiving the indication may select an appropriate AMF that can support the onboarding procedure for the terminal 100 based on the indication (S150). The terminal 100 may indicate the ON-SNPN as the selected network, and the NG-RAN node may transfer an ID of the ON-SNPN (i.e., a combination of PLMN ID and NID) selected by the terminal to the selected AMF. Information about the AMF that can support the onboarding procedure may be pre-configured in the NG-RAN node. Alternatively, the NG-RAN node may dynamically determine the AMF that can support the onboarding procedure.

Since the configuration information in the terminal 100 may not include any S-NSSAI and/or DNN that may be used for the onboarding, the S-NSSAI and/or DNN may not be included in the RRC request by the terminal 100 when the terminal 100 registers with the ONN for the UE onboarding purpose.

Thereafter, the terminal 100 may initiate a NAS registration procedure by sending a NAS registration request message (S160). In an embodiment, the NAS registration request message may have the following characteristic.

The terminal 100 may set a 5GS registration type to the value "SNPN onboarding" indicating that the registration request is for the onboarding service.

The terminal 100 may provide a subscription concealed identifier (SUCI) derived from subscription permanent identifier (SUPI) to the onboarding network through the NAS registration request message. The SUPI may uniquely identify the terminal 100 and may be derived from the default UE credentials. The ON-SNPN may determine a corresponding DCS identity and/or address/domain based on the SUCI.

In an embodiment, the terminal 100 may not include a Requested NSSAI in NAS signaling when registering with the ONN for the UE onboarding purposes.

AMF onboarding configuration data may be configured in an AMF supporting UE onboarding. In an embodiment, the AMF onboarding configuration data may include the following.

the DNN and the S-NSSAI used for UE onboarding or SMF supporting the S-NSSAI and the DNN to be used for UE onboarding Information to enable user plane remote provisioning for the terminal 100 within the SNPN Referring to FIG. 2, When the AMF receives the NAS registration request with a predetermined 5GS registration type as the "SNPN onboarding", the AMF may initiate an authentication procedure for the terminal 100 by using the AUSF. In an embodiment, the AMF may select an appropriate AUSF for UE onboarding. Thereafter, the AUSF may authenticate the terminal 100 based on the default UE credentials (S170). The default UE credentials may be received from the DCS or from the terminal to the AUSF.

In an embodiment, the AUSF may identify the SUPI by decoding the SUCI of the terminal 100 and determine, by using the SUPI, the ID of the DCS and/or the address/domain of the DCS that can authenticate the default UE credentials of the terminal 100.

The AMF may select an SMF using the AMF onboarding configuration data. The AMF onboarding configuration data may be used to restrict UE network usage to only onboarding for user plane remote provisioning of the terminal 100.

When the AUSF succeeds in the authentication of the terminal 100, the AMF may notify the result of the registration to the terminal 100 (S180). If the terminal 100 is not successfully authenticated, the AMF may reject the registration procedure for onboarding, and the UE may select other ON-SNPN to attempt registration (S190).

In an embodiment, the onboarding network may be a PLMN. The terminal 100 configured with PLMN credentials in the USIM for the primary authentication may perform registration for onboarding to the PLMN for provisioning of SO-SNPN credentials.

When the terminal 100 uses the PLMN credentials to access the PLMN as the onboarding network, a normal network selection and initial registration procedure may be applied. After successful registration in the ON-PLMN, the terminal 100 may be provisioned with SO-SNPN credentials via the user plane.

Figure 3:
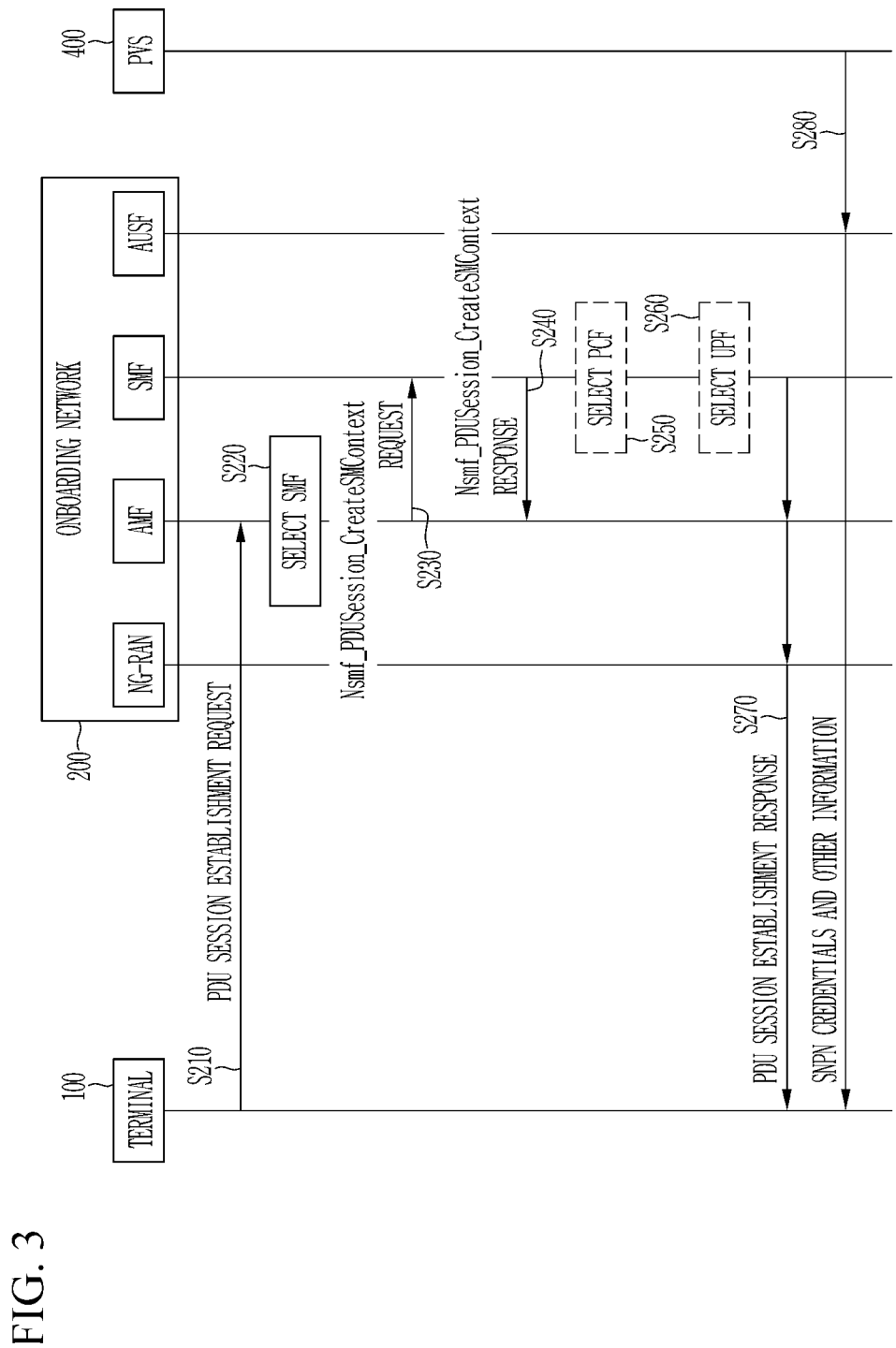
FIG. 3 is a flowchart illustrating a remote provisioning method through an onboarding network according to an embodiment.

FIG. 3 is a flowchart illustrating a remote provisioning method through an onboarding network according to an embodiment.

Referring to FIG. 3, when the authentication of the terminal 100 is successfully completed by the onboarding network 200, the terminal 100 may transmit a restricted PDU session establishment request to the AMF of the onboarding network 200 (S210).

Upon receiving the PDU session establishment request from the terminal 100, the AMF may select an appropriate SMF for onboarding of the terminal 100 based on the AMF onboarding configuration data (S220) and send an Nsmf_PDUSession_CreateSMContext request (i.e., request to create the PDU session) to the selected SMF (S230). In an embodiment, the request for creating the PDU session may include the AMF onboarding configuration data.

In an embodiment, the AMF may select an SMF suitable for onboarding based on the S-NSSAI and DNN to be used for UE onboarding in the AMF onboarding configuration data. Alternatively, the AMF may select an SMF suitable for onboarding based on the information about the SMF supporting the DNN and S-NSSAI used for UE onboarding in the AMF onboarding configuration data. The AMF may determine the SMF through internal policies determined based on history of the onboarding services such as load distribution and service experience (e.g. QoE).

The SMF selected for the onboarding service of the terminal may send an Nsmf_PDUSession_CreateSMContext response to the AMF (S240).

In order to enable UP remote provisioning of the SNPN credentials to the terminal 100, the UE configuration data for UP remote provisioning may be pre-configured in the terminal 100 or may be provided by the onboarding network. The UE configuration data for UP remote provisioning, provided by the onboarding network, may take precedence over UE configuration data pre-configured in the terminal 100. The UE configuration data for UP remote provisioning may include PVS address(es) (e.g., PVS IP addresses) or PVS Fully Qualified Domain Name(s) (FQDN(s)) of the PVS 400.

When the terminal 100 does not have the PVS IP address or the PVS FQDN after establishing a restricted PDU session used for onboarding, the terminal 100 may configure an FQDN for PVS discovery. The UE configuration data for UP remote provisioning may be stored in mobile equipment (ME) of the terminal.

The UE configuration data for UP remote provisioning may be locally configured in the SMF of the onboarding network.

Alternatively, the UE configuration data for the UP remote provisioning may be provided to the AMF of the onboarding network 200 by the DCS as a part of the authentication procedure and then sent to the SMF by the AMF through the PDU session establishment request.

In an embodiment, the SMF of the onboarding network 200 may select the PCF for the onboarding service of the terminal (S250). When a PCF is selected for UP remote provisioning, the SMF may provide the UE configuration data to the PCF when requesting an SM policy association.

When the SMF receives a PDU session establishment request for onboarding several times from a specific terminal or many terminals for a specific time window, different PVS IP address(es) and/or PVS FQDN(s) in the UE configuration data may be provided for reliable onboarding service to the terminal 100 from the SMF. In this case, a plurality of PVS IP addresses and/or PVS FQDNs may be configured in the UE configuration data of the SMF. In an embodiment, the SMF may provide the UE configuration data to the PCF during the SM policy association modification procedure in order to maintain the most up-to-date information.

The UE configuration data for UP remote provisioning may be provided to the UE from the SMF of the onboarding network 200 for the establishment of the restricted PDU session as protocol configuration options (PCO) in the PDU session establishment response (S270).

UP remote provisioning of the terminal 100 when the onboarding network is the ON-SNPN is described below.

When the onboarding service is provided via the user plane using the restricted PDU session for remote provisioning of the terminal 100, the AMF may choose the SMF to be used for the onboarding service by using SMF discovery and selection functionality. The AMF onboarding configuration data may include the 5-NSSAI(s) and DNN(s) used for onboarding to select the SMF used for the onboarding service. Alternatively, the AMF onboarding configuration data may include an SMF supporting the S-NSSAI and DNN used for onboarding.

In an embodiment, the SMF of the onboarding network 200 may select the UPF for the onboarding service of the terminal S260. When the UPF is selected for the onboarding service, a UPF selection function for a general service may be applied in consideration of the DNN used for onboarding. Thereafter, the SMF may send an establishment/modification request of a session to the selected UPF and receive a session establishment/modification response from the selected UPF as a response (N4 Session establishment/modification request/response).

The SMF or PCF may store S-NSSAI and DNN information used for onboarding. The onboarding configuration data available for the PCF and/or the SMF may include the PVS FQDN(s) and the PVS IP address(es). When a plurality of PVS IP addresses and/or PVS FQDNs are configured in the SMF, different PVS FQDNs and/or PVS IP addresses may be used for reliable onboarding services.

After the SNPN credentials are successfully provisioned remotely via the user plane of the onboarding network 200 to the terminal 100 registered for onboarding, the terminal 100 may deregister from the onboarding network.

Initial QoS parameters used to set the onboarding service when a dynamic policy and charging control (PCC) is not used may be configured in the SMF. The Dynamic PCC may be used for a PDU session established for the onboarding service.

The QoS flow of the PDU session related to the restricted DNN may be dedicated to the onboarding service. The SMF may configure a packet detection rule (PDR) and forwarding action rule (FAR) including the PVS and DNS IP address for the UPF to block any traffic that is not from or to the PVS and the DNS addresses.

When the terminal 100 is registered for onboarding, the network may apply the S-NSSAI and DNN used for onboarding for the restricted PDU session establishment request from the terminal 100.

Afterwards, the terminal may receive the SNPN credentials and other information from the PVS determined based on the PVS IP address and/or PVS FQDN in the UE configuration data (S280).

The UP remote provisioning of the terminal 100 when the onboarding network is PLMN is described below.

The onboarding service for the terminal 100 may be provided via the PLMN using the PDU session for the DNN(s)/S-NSSAI(s) used for remote provisioning. The subscription information data of such terminal 100 may include the DNN/S-NSSAI used for remote provisioning.

The AMF may consider the default DNN/S-NSSAI provided by the UDM or the DNN/S-NSSAI used for remote provisioning provided by the terminal 100 and select the SMF to be used for remote provisioning by using the SMF discovery and selection functionality.

The UPF selection function may be applied in consideration of the DNN/S-NSSAI used for remote provisioning.

At least one PVS FQDN and/or PVS IP address(es) may be configured in the SMF for each DNN/S-NSSAI used for remote provisioning. The SMF may transmit the PVS FQDN and/or PVS IP address(es) related to the DNN/S-NSSAI of the PDU session to the terminal 100 as a part of the protocol configuration option (PCO) in the PDU session establishment response.

When the SMF receives a request for the PDU session establishment for onboarding several times from a specific terminal or many terminals for a specific time window, different PVS IP address(es) and/or PVS FQDN(s) may be provided to the terminal 100 from the SMF for reliable onboarding service. At this time, a plurality of PVS IP addresses and/or PVS FQDNs may be configured in the SMF.

As described above, to obtain the SNPN credentials via remote provisioning, the terminal may select an appropriate onboarding network and access the selected onboarding network.

Figure 4:
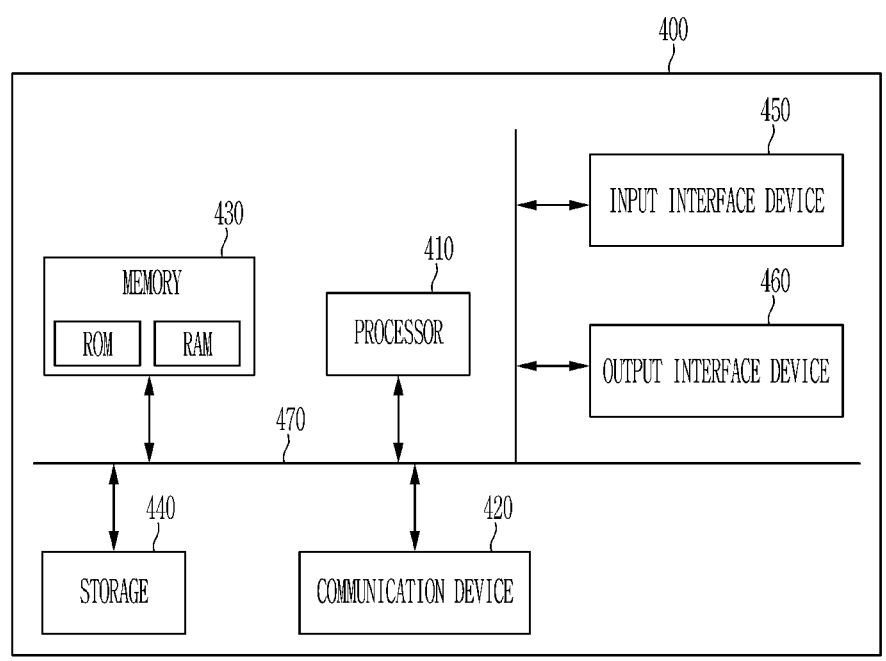
FIG. 4 is a block diagram illustrating a terminal or a function device in a wireless network according to an embodiment.

FIG. 4 is a block diagram illustrating a terminal or a function device in a wireless network according to an embodiment.

The terminal and/or function device in a wireless network according to an embodiment may be implemented as a computer system, for example, a computer-readable medium. Referring to FIG. 4, the computer system 400 may include at least one of a processor 410, a memory 430, an input interface device 450, an output interface device 460, and a storage device 440 communicating through a bus 470. The computer system 400 may also include a communication device 420 coupled to the network. The processor 410 may be a central processing unit (CPU) or a semiconductor device that executes instructions stored in the memory 430 or the storage device 440. The memory 430 and the storage device 440 may include various forms of volatile or non-volatile storage media. For example, the memory may include read only memory (ROM) or random-access memory (RAM). In the embodiment of the present disclosure, the memory may be located inside or outside the processor, and the memory may be coupled to the processor through various means already known. The memory is a volatile or nonvolatile storage medium of various types, for example, the memory may include read-only memory (ROM) or random-access memory (RAM).

Accordingly, the embodiment may be implemented as a method implemented in the computer, or as a non-transitory computer-readable medium in which computer executable instructions are stored. In an embodiment, when executed by a processor, the computer-readable instruction may perform the method according to at least one aspect of the present disclosure.

The communication device 420 may transmit or receive a wired signal or a wireless signal.

On the contrary, the embodiments are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like.

Program instructions may include machine language code such as those produced by a compiler, as well as high-level language code that may be executed by a computer via an interpreter, or the like.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages, and may be deployed in any form including a stand-alone program or a module, a component, a subroutine, or other units suitable for use in a computing environment.

A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random-access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks.

Examples of information carriers suitable for embodying computer program instructions and data include semiconductor memory devices, for example, magnetic media such as a hard disk, a floppy disk, and a magnetic tape, optical media such as a compact disk read only memory (CD—ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium.

A processor and a memory may be supplemented by, or integrated into, a special purpose logic circuit. The processor may run an operating system 08 and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements.

For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination.

Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above—described program components and apparatuses may be incorporated into a single software product or may be packaged in multiple software products.

While this disclosure has been described in connection with what is presently considered to be practical example embodiments, it is to be understood that this disclosure is not limited to the disclosed embodiments.

On the contrary, it is intended to cover various modifications and equivalent arrangements included within the spirit and scope of the appended claims.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A terminal for performing an onboarding procedure for remote provisioning, the terminal comprising:
a processor, a memory, and a communication device, wherein the processor executes a program stored in the memory to perform:
receiving an onboarding enabled indication from at least one onboarding network through the communication device;
selecting an onboarding network based on the onboarding enabled indication and onboarding network selection information configured in the terminal; and
attempting registration for the selected onboarding network through the communication device,
wherein the onboarding network selection information includes include stand-alone Non-Public Network (SNPN) network identifiers and Group IDs for Network selection (GINs).
wherein when a Public Land Mobile Network (PLMN) is selected as the onboarding network, the terminal uses PLMN credentials, and
wherein when the terminal does not have a provisioning server (PVS) IP address or a Fully Qualified Domain Name (PVS FQDN) after establishing a restricted protocol data unit (PDU) session used for onboarding, user equipment (UE) configuration data for UP remote provisioning is provided to a mobile management function (AMF) of the onboarding network by a default credential sever (DCS) as a part of an authentication procedure, and then sent to a SMF session management function (SMF) by the AMF through a PDU session establishment request.

2. The terminal of claim 1, wherein:
when attempting registration for the selected onboarding network, the processor executes the program to perform:
transmitting a radio resource control (RRC) connection request message to an access network (AN) node of the selected onboarding network through the communication device,
and the RRC connection request message includes an indication indicating that the RRC connection request is for an onboarding service.

3. The terminal of claim 2, wherein:
the processor executes the program to further perform:
transmitting a non-access stratum (NAS) registration request to an access and mobility management function (AMF) in the selected onboarding network through the communication device,
and the AMF is selected by the AN node based on the indication indicating that the RRC connection request is for the onboarding service.

4. The terminal of claim 3,
wherein when transmitting a NAS registration request to an AMF of the selected onboarding network, the processor executes the program to perform:
setting a registration type to a value indicating that the NAS registration request is for the onboarding service.

5. The terminal of claim 3, wherein the NAS registration request includes a subscription concealed identifier (SUCI) of the terminal.

6. The terminal of claim 3,
wherein the processor executes the program to further perform:
transmitting a protocol data unit (PDU) session establishment request to the AMF through the communication device after the NAS registration request is accepted; and
receiving a response corresponding to the PDU session establishment request from the AMF through the communication device and accessing a provisioning server (PVS) for the remote provisioning.

7. The terminal of claim 6, wherein the response includes configuration data for the remote provisioning and the configuration data includes a PVS Internet protocol (IP) address or PVS fully qualified domain name (FQDN) of the PVS.

8. The terminal of claim 6, wherein:
the processor executes the program to further perform:
receiving stand-alone Non-Public Networks (SNPN) credentials from the PVS after accessing the PVS,
and the SNPN credentials is information required for the terminal to access the SNPN.

* * * * *